United States Patent Office 2,760,947
Patented Aug. 28, 1956

2,760,947

SELF-EXTINGUISHING ALKENYL POLYMER COMPOSITIONS CONTAINING BROMO-CHLORO COMPOUNDS

Thomas E. Werkema, John W. Thorsberg, and Chancey E. De Long, Midland, Mich., assignors to The Dow Chemical Company, Midland, Mich., a corporation of Delaware No Drawing. Application February 24, 1953,
Serial No. 338,615

7 Claims. (Cl. 260—33.8)

This invention relates to fire and flame retardant compositions having utility in various manufactured articles which are to be protected against the propagation of flames. More particularly it relates to fire and flame retardant thermoplastic compositions formed from alkenyl aromatic polymers.

The term alkenyl aromatic polymers, when used hereinafter in this application, should be construed as including thermoplastic polymers and copolymers containing in chemically combined form at least 50 per cent by weight of a monoalkenyl aromatic compound having the general formula:

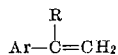

wherein Ar represents a monovalent aromatic radical and R represents hydrogen or the methyl radical. Examples of such alkenyl aromatic resins are the solid homopolymers of styrene, alpha-methyl styrene, ar-vinyl toluene, ar-vinyl xylene, and ar-ethylvinyl benzene; the solid copolymers of two or more of such alkenyl aromatic compounds with one another; and solid copolymers of one or more of such alkenyl aromatic compounds with a minor amount of other polymerizable olefinic compounds, e. g. a copolymer of 90 weight per cent of styrene and 10 per cent of vinyl chloride.

By fire and flame retardant compositions are meant compositions which retard the propagation of a flame across their surfaces once the igniting source is removed and will not support combustion for more than 30 seconds independently of an external source of heat. Compositions meeting these specifications will hereinafter be referred to as self-extinguishing.

Many compositions have been employed in the past to render alkenyl aromatic polymers flame retardant. It is known that halogen containing compounds often will reduce the flammability of other compounds intimately mixed therewith. Further, in U. S. Patent 2,574,518 it is disclosed that brominated compounds are superior to chlorinated compounds for imparting fire retarding properties to normally inflammable compositions. However, such compounds, when mixed with alkenyl aromatic resins, frequently impair the properties of the so-formed composition in such a manner as to reduce the usefulness of the composition for making finished articles. Especial care in selecting a flameproofing agent must be exercised when it is desired to make flame retardant cellular thermoplastic articles suitable for insulating homes, ships, etc. Such articles consist of a multiplicity of cells separated by thin walls of polymer. It is essential that the mechanical and physical properties of such articles be as high as possible.

It is an object of this invention to provide fire and flame resistant compositions produced from alkenyl aromatic polymers. It is a further object to provide fire and flame retardant agents, which, when added to alkenyl aromatic polymers, will not impair the desirable physical properties of the polymers.

It is a further object to provide fire and flame retardant cellular articles made from alkenyl aromatic resins.

The objects of this invention are accomplished by having distributed uniformly throughout the polymeric composition a halogenated aliphatic hydrocarbon containing therein atoms of at least two different halogens.

The halogenated compounds which are useful for carrying out this invention are aliphatic hydrocarbons, with a combination of multiple chlorine and bromine atoms. Examples of typical compounds are dibromo dichloro methane, 1,2-dibromo-1,1-dichloroethane, and 1,2-dibromo-1,1,2,2-tetrachloroethane. It is not necessary that the halogens be arranged symmetrically about the carbon atoms. The compounds of this invention show a surprising improvement in fire retarding ability in alkenyl aromatic polymers over similar compounds containing the same number but of only one kind of halogen atoms. For example, 1,2-dibromo-1,1-dichloroethane imparts fire-retardant properties to polystyrene that are superior to those imparted by 1,1,2,2-tetrabromo ethane. These results were unexpected in view of the fact that bromine compounds are taught to be more effective in imparting flame retarding properties to polymeric compositions than chlorine compounds.

The compounds of this invention may be used when either solid or cellular articles are made from alkenyl aromatic polymers. The alkenyl aromatic polymer may be made by any known method.

The fire retarding agents of this invention may be incorporated into the solid polymer by any method which will give uniform and permanent distribution. The agent may be stirred into the molten polymer, or the agent may be dry blended with the polymer and dissolved when the mixture is melted during subsequent plastic working operations.

If cellular articles are desired, they may be formed by any known method. An especially suitable method is described in U. S. Patent 2,450,436. In that method, a volatile substance, commonly known as a blowing agent, is dissolved at superatmospheric pressure in a molten polymer to form a gel. A pressure from an inert gas may be superimposed on the system. The gel is passed into a cooled zone to lower the gel temperature below the critical temperature of the volatile substance and then is released through an aperture to atmospheric pressure. In so doing, the gel rapidly expands and solidifies due to the vaporization of the volatile substance. The article so produced consists of uniformly sized cells separated by thin walls of solid polymer. The size of the cells may be varied by raising or lowering the temperature of the gel near the aperture, and also by varying the pressure of the inert gas on the gel. The cellular article so produced, is strong and has excellent insulating properties. However, it is flammable and, as such, is undesirable as an insulating material wherever fire hazards must be avoided.

It has been found that fire retardant cellular articles may be made from normally flammable alkenyl aromatic polymers by incorporating into the starting materials before formation of the cellular article a minor amount of an aliphatic halogenated compound containing at least two different halogens. The agent must be uniformly mixed throughout the gel before extrusion. A preferred method of adding the agent is to mix it with the volatile substance, and then to add both substances to the polymer simultaneously. When added in this manner, the halogenated compound becomes intimately mixed with the polymer. A cellular article produced from these starting materials retains all of the desirable properties, such as color and strength, of its flammable counterpart, and in addition is fire retardant. Such a material is admirably suited for use as an insulating material.

The amount of halogenated compound that is necessary to impart flame retarding properties to articles produced from alkenyl aromatic resins is from 0.5 per cent to 5.0 per cent. The preferred range for cellular articles is from 1.25 to 3 per cent based on the weight of the foamed article. Lesser quantities are required for solid molded objects. In these cases the preferred range is from 1-2.5 per cent based on the weight of polymer.

The advantages of the invention will be more apparent from the following examples which are intended to be illustrative only. Unless otherwise specified, all parts are by weight.

EXAMPLE 1

A cellular foam was produced in the usual manner from a mixture of 25 parts of polystyrene and 2 parts of methyl chloride, to which had been added 0.725 part of 1,2-dibromo-1,1-dichloro ethane. Samples of the foam were tested for flammability, using a modification of the procedure described in ASTM D757–49. The samples used were 5 x ½ x ½ inches. Each sample was exposed to the ignition element for only 30 seconds. The flame in all samples was self-extinguished in 5 seconds after removal from the incandescent element. For purposes of comparison, a polystyrene foam was made in the same way except that 0.975 part 1,1,2,2-tetrabromo ethane replaced the 1,2-dibromo-1,1-dichloro ethane as the fire retarding agent. Six samples were tested according to the modified ASTM test D757–49. All samples burned.

EXAMPLE 2

A polystyrene foam was made according to the method of Example 1 except that 0.438 part of 1,2-dibromo-1,1,-2,2-tetrachloro ethane replaced the 1,2 dibromo-1,1-dichloro ethane. Six samples of this foam, when tested according to the modified ASTM test D757–49, were extinguished in 19 seconds (self extinguishing).

EXAMPLE 3

A sample of foam was made from a copolymer of styrene and alpha methyl styrene using methyl chloride as the blowing agent.

A similar sample of foam was prepared containing in addition 2.0 per cent dibromo dichloro methane.

Both of the above samples were tested to determine some of the most important physical properties. The results are listed in Table 1.

*Table 1*

|  | Dibromo dichloro methane | No fire retarding agent |
|---|---|---|
| Percent agent used | 2.0 | |
| Foam cell size (mm.) | 1.2 | 1.2 |
| Foam density, lbs./ft.³ | 2.24 | 1.93 |
| Foam compressive strength (p. s. i.) | 35 | 26.7 |
| Foam bending modulus (p. s. i.) | 1,080 | 1,065 |
| Foam, inch-lbs. impact strength | 1.9 | 1.5 |
| Time to be self-extinguished | 13 secs. | burns |

From the above results it can be seen that the properties of the modified foam are equal or improved over the properties of an unmodified foam.

EXAMPLE 4

Samples of a comercial molding grade of granular polystyrene were blended with 1, 2 and 3 per cent by weight of 1,2-dibromo 1,1-dichloro ethane, each of the three mixtures was milled on a compounding mill and compression molded. Each of the molded samples was ignited in the flame of a Bunsen burner and after ignition the burner was withdrawn. All of the samples were self-extinguishing.

EXAMPLE 5

By the method of Example 4 three molded samples of a fire retardant composition were prepared in which dibromo dichloro methane replaced the 1,2-dibromo-1,1-dichloro ethane. When these samples were ignited in the flame of a Bunsen burner and after ignition the burner removed, each was self-extinguishing.

EXAMPLE 6

98.5 parts of a commercial molding grade of granular polystyrene was milled with 1.5 parts of 1,2-dibromo-1,1,2,2-tetrachloroethane. The sample was compression molded, and found to be self-extinguishing by the method of Example 5.

We claim:

1. A fire and flame retardant permanently thermoplastic composition consisting essentially of an alkenyl aromatic polymer made only from monoethylenically unsaturated monomeric material, and a relatively small amount of a non-flammable lower aliphatic polyhalogenated hydrocarbon selected from the group consisting of dibromo dichloromethane, 1,2-dibromo-1,1-dichloroethane, and 1,2-dibromo-1,1,2,2-tetrachloroethane.

2. The composition claimed in claim 1, wherein the amount of the non-flammable compound is from 0.5 to 5 per cent of the weight of the composition.

3. A composition as claimed in claim 1 wherein the polyhalogenated compound is dibromo dichloro methane.

4. A composition as claimed in claim 1 wherein the polyhalogenated compound is 1,2-dibromo-1,1-dichloro ethane.

5. A composition as claimed in claim 1 wherein the polyhalogenated compound is 1,2-dibromo-1,1,2,2-tetrachloro ethane.

6. A composition as claimed in claim 1 wherein the alkenyl aromatic polymer is polystyrene.

7. A composition as claimed in claim 1 wherein the alkenyl aromatic polymer is a copolymer of styrene and alphamethyl styrene.

References Cited in the file of this patent

UNITED STATES PATENTS

| 2,478,036 | Baum et al. | Aug. 2, 1949 |
| 2,515,250 | McIntire | July 18, 1950 |
| 2,617,780 | Lutz | Nov. 11, 1952 |
| 2,676,927 | McCurdy et al. | Apr. 27, 1954 |

FOREIGN PATENTS

| 554,602 | Great Britain | July 12, 1943 |